US008826336B2

(12) United States Patent
Angiolillo et al.

(10) Patent No.: US 8,826,336 B2
(45) Date of Patent: Sep. 2, 2014

(54) METHODS AND SYSTEMS FOR PROVIDING A PLURALITY OF LAST APPLICATIONS

(75) Inventors: Joel S. Angiolillo, Weston, MA (US); Ronald J. Parrino, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1398 days.

(21) Appl. No.: 12/194,869

(22) Filed: Aug. 20, 2008

(65) Prior Publication Data

US 2010/0050219 A1 Feb. 25, 2010

(51) Int. Cl.
*H04N 5/445* (2011.01)
*H04N 21/422* (2011.01)
*H04N 21/443* (2011.01)
*H04N 21/466* (2011.01)
*H04N 21/433* (2011.01)
*H04N 21/472* (2011.01)

(52) U.S. Cl.
CPC ....... *H04N 21/443* (2013.01); *H04N 21/42204* (2013.01); *H04N 21/4667* (2013.01); *H04N 21/4331* (2013.01); *H04N 21/472* (2013.01)
USPC .............................................. 725/46; 725/47

(58) Field of Classification Search
USPC ...................................................... 725/46, 47
See application file for complete search history.

(56) References Cited

U.S. PATENT DOCUMENTS

| | | | |
|---|---|---|---|
| 7,237,240 B1 * | 6/2007 | Chen et al. | 718/100 |
| 2006/0294063 A1 * | 12/2006 | Ali et al. | 707/3 |
| 2007/0157247 A1 * | 7/2007 | Cordray et al. | 725/47 |
| 2007/0162953 A1 * | 7/2007 | Bolliger et al. | 725/142 |
| 2008/0294619 A1 * | 11/2008 | Hamilton et al. | 707/5 |

* cited by examiner

*Primary Examiner* — Nasser Goodarzi
*Assistant Examiner* — Michael Hong

(57) ABSTRACT

A system and method may include receiving, at a set top box, one or more user inputs from an input device, analyzing the one or more user inputs to identify last application data, prioritizing one or more pointers associated with the last application data based on at least usage data, receiving, at the set top box, one or more request messages from the input device, and outputting, to a display device, last application information, in response to receiving the one or more request messages, based on the prioritization of the one or more pointers.

25 Claims, 8 Drawing Sheets

METHODS AND SYSTEMS FOR PROVIDING A PLURALITY OF LAST APPLICATIONS

BACKGROUND INFORMATION

Currently, television technologies may be configured to provide television viewers with a method of accessing and/or viewing the last television channel tuned to by activating a single button on a remote control. Accordingly, viewers may be able to seamlessly access and/or view (e.g., switch between) two television channels, such as, the last television channel and the current television channel using a single button (e.g., the "LAST" button) on a remote control. With the recent evolution of television technologies, however, viewers may be able to use a television to access and/or view a plurality of television program applications, such as, Video On Demand (VOD) television program applications, Digital Video Recorder (DVR) television program applications, television broadcast program applications, etc. Thus, enabling viewers to seamlessly access and/or view only two television channels may limit the television watching experience. For these reasons, television service providers may search for methods and systems to provide viewers with a seamless way to access and/or view a plurality of television program applications that have been recently accessed.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes elements of a system that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a system, some of which are explicitly shown in figures, others that are not. The inclusion of some physical elements of a system may help illustrate how a given system may be modeled. It should be noted, however, that all illustrations are purely exemplary and that the last applications system described herein may be performed on different varieties of systems which may include different physical and logical elements.

Figure 1:
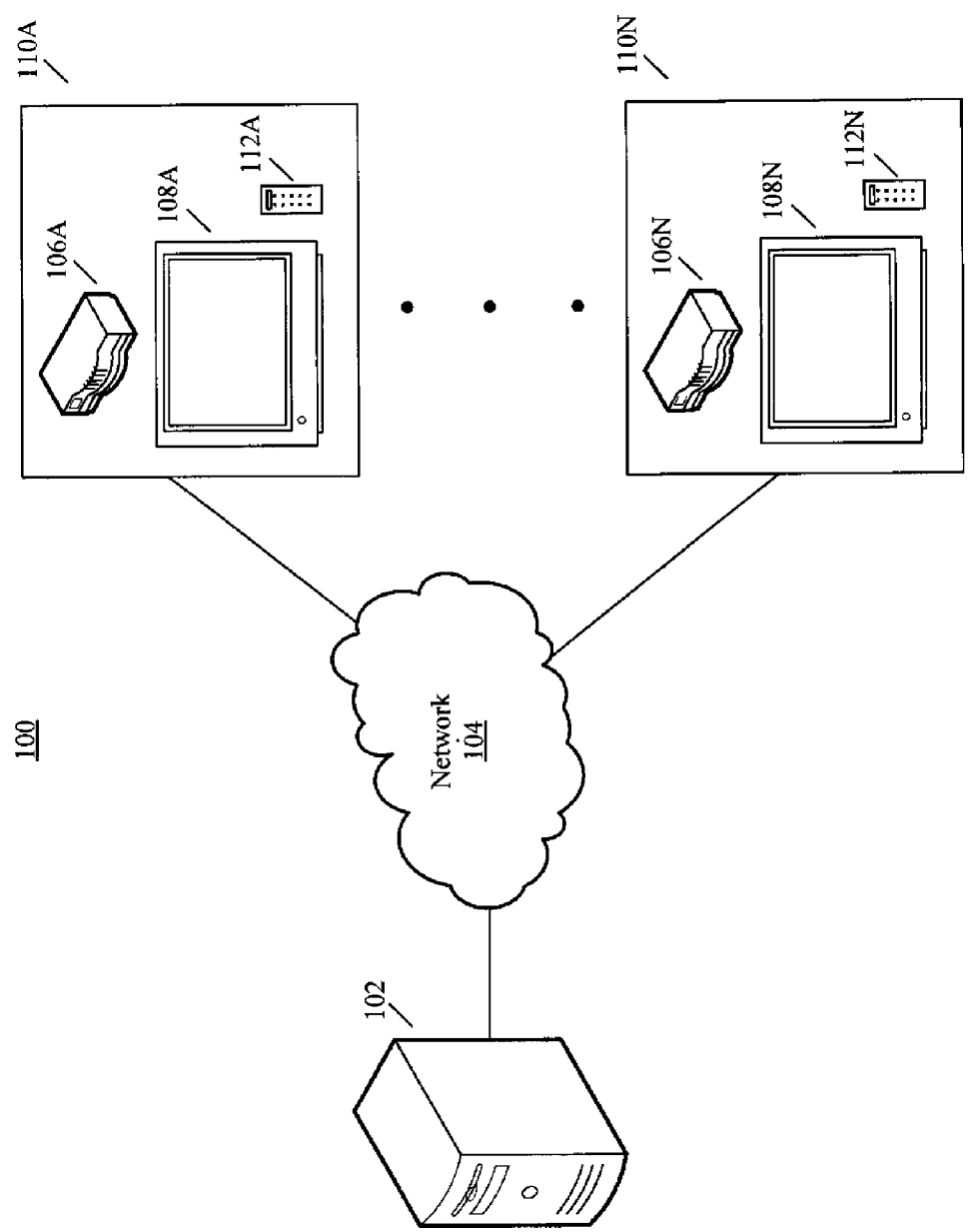
FIG. 1 illustrates a block diagram of a last applications system in accordance with exemplary embodiments.

For instance, the last applications system 100 in FIG. 1 illustrates a simplified view of a system and various elements in the system 100. It is noted that other hardware and software not depicted may be included in the last applications system 100. It is also noted that the last applications system 100 illustrates a specific number of instances of a server 102, a network 104, a set top box 106, a display device 108, a user premise 110, and an input device 112. It will be appreciated that a single instance and/or multiple instances of these entities may be included in a system.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

In various embodiments, a last applications system may enable a user to access and/or view one or more last applications previously accessed by the user A last application may include a recently and/or a frequently user accessed application. For example, a last application may include a Video On Demand (VOD) movie recently accessed and/or viewed by a user, such as, "Forest Gump." In another example, a last application may include a Digital Video Recorder (DVR) version of a television show recently accessed and/or viewed by a user, such as, episode 29 of the television show "Friends." In yet another example, a last application may include a draft of an Email recently accessed and/or viewed by a user, such as, "To: johndoe@Acme.com, Subject: Schedule of Meeting, Body: Dear John-."

In various embodiments, the last applications system may output to the user one or more last applications arranged by one or more categories (or one or more last application categories). For example, the last applications system may output to the user one or more last applications associated with an "Email Applications" category, one or more last applications associated with a "VOD Applications" category, one or more last applications associated with a "TV Broadcast Applications" category, one or more last applications associated with a "DVR Applications" category, one or more last applications associated with a "Chat Applications" category, one or more last applications associated with a "Gaming Applications" category, one or more last applications associated with a "News Applications" category, and/or one or more last applications associated with any other category determined based on design preferences.

In various embodiments, the last applications system may output to the user one or more last applications based on usage data (or last application usage data). In various embodiments, one or more algorithms may be applied to one or more pointers to determine usage data. In an exemplary embodiment, determining usage data may include applying a least recently used (LRU) algorithm (described in further detail below) to one or more pointers associated with one or more last applications. In an exemplary embodiment, determining usage data may include applying a least frequently used (LFU) algorithm (described in further detail below) to one or more pointers associated with one or more last applications.

A user may access and/or view one or more last applications outputted by the last applications system using an input device to input data into a set top box associated with the last applications system.

FIG. 1 illustrates a last applications system 100 in accordance with exemplary embodiments. In various embodiments, the last applications system 100 may cause the display of one or more last applications based one or more user inputs and/or one or more request messages (or last application request messages). In various embodiments, the last applications system 100 may analyze one or more user inputs received from a user via an input device to identify a last application. The last applications system 100 may use the analyzed information to store and/or prioritize one or more pointers associated with the last application data and/or to output one or more last applications.

In exemplary embodiments, the last applications system 100 may include a server 102 communicatively coupled to a network 104, and one or more set top boxes 106 at one or more user premises 110 communicatively coupled to the network 104. The network 104 may communicate update message signals (or last application update messages signals) and/or live session message signals (or last application live session message signals) from the server 102 to the set top boxes 106. The server 102 may communicate the update message signals and/or live session message signals to the set top box 106 via the network 104 individually or to the set top boxes 106 as a group. In an exemplary embodiment, the server 102 may broadcast, multicast, and/or unicast the update message signals and/or live session message signals.

The update message signals may be, for example, television signals and/or audio signals that may be in digital or analog form, data, requests, other digital information and/or analog information, and/or combinations thereof. The update message signals may include update data (e.g., data associated with providing one or more last applications with the most recent data) associated with one or more last applications that are updated by information stored and/or accessed by the server 102. Update data may include video data, audio data, text data, and/or other types of visual and/or audible information. For example, one or more last applications may be associated with a sports game (e.g., a football game between the Washington Redskins and the New York Giants) that is in the process of being played. Accordingly, the server 102 may communicate one or more update message signals associated with the latest and/or most recent statistics of the sports game (e.g., score of the sports game, time remaining in the sports game, injured players list) to the set top box 106. The update message signals may be used to display update data associated with one or more last applications at the display device 108 in response to a request message received from the user via the input device 112. It is noted that the input device 112 may be integrated in either the set top box 106, the display device 108, or both.

The live session message signals may be, for example, live session data signals that may be in digital or analog form, data, requests, other digital information and/or analog information, and/or combinations thereof. In a last application associated with live communication (e.g., an interactive gaming last application, a chat session last application), the live session message signal may include live session data used to establish and/or reestablish a network session configured to allow live communication between one or more set top boxes 106 located at different user premises 110 or the same user premise 110 for one or more last applications. Live session data may include video data, audio data, text data, and/or other types of visual and/or audible information. For example, one or more last applications may be associated with a chat session between one or more users associated with one or more set top boxes 106 located at different user premises 110 or the same user premise 110. Accordingly, prior to the chat session being displayed as a last application, the server 102 may communicate one or more live session message signals associated with reconnecting (e.g., reestablishing) the chat session between the one or more users at the one or more set top boxes 106, in the event the chat session is disconnected. The live session message signal may be used to display up-to-date data associated with one or more last applications at the display device 108 in response to a request message received from the user via the input device 112.

The network 104 may be a wired network, a wireless network, and/or combinations thereof. The network 104 may transport the update message signals, live session message signals, and/or various messages in analog and/or digital form from the server 102 to the set top boxes 106. The network 104 may transport analog and/or digital messages from the set top boxes 106 to the server 102. In an exemplary embodiment, at least a portion of the network 104 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 104 also may comply with other standards. The network 104 also may be a cable television network, a satellite network, a fiber optic network, and combinations thereof, or other networks capable of distributing an update message signal and/or a live session message signal from the server 102 to the set top boxes 106, and exchanging information, messages, requests, etc., between the server 102 and the set top boxes 106 via the network 104.

The user premises 110A-N may each include a set top box 106 and a display device 108. FIG. 1 illustrates a set top box 106A and a display device 108A at user premises 110A, and a set top box 106N and a display device 108N at user premises 110N. It is also noted that a single user premises 110 may include multiple set top boxes 106 and multiple display devices 108. The set top box 106 also may be remotely located from the display device 108.

In an exemplary embodiment, the set top box 106 may be a hardware device that may receive an update message signal from the network 104 and may cause display of the update message signal at the display device 108. The set top box 106 may be a hardware device that may receive a live session message signal from the network 104 and may cause display of one or more last applications associated with the live session message signal at the display device 108. The set top box 106 may be a hardware device that may communicate messages to the network 104.

It is noted that the set top box 106 and the display device 108 are depicted and described as being separate devices in FIG. 1. The set top box 106 and the display device 108, however, may be combined into a single unit. The functions performed by the set top box 106 and the display device 108 also may implemented in a mobile phone, a wireless device, or any other device that may communicate via the network 104. The set top box 106 and the server 102 are discussed in further detail below.

Figure 2:
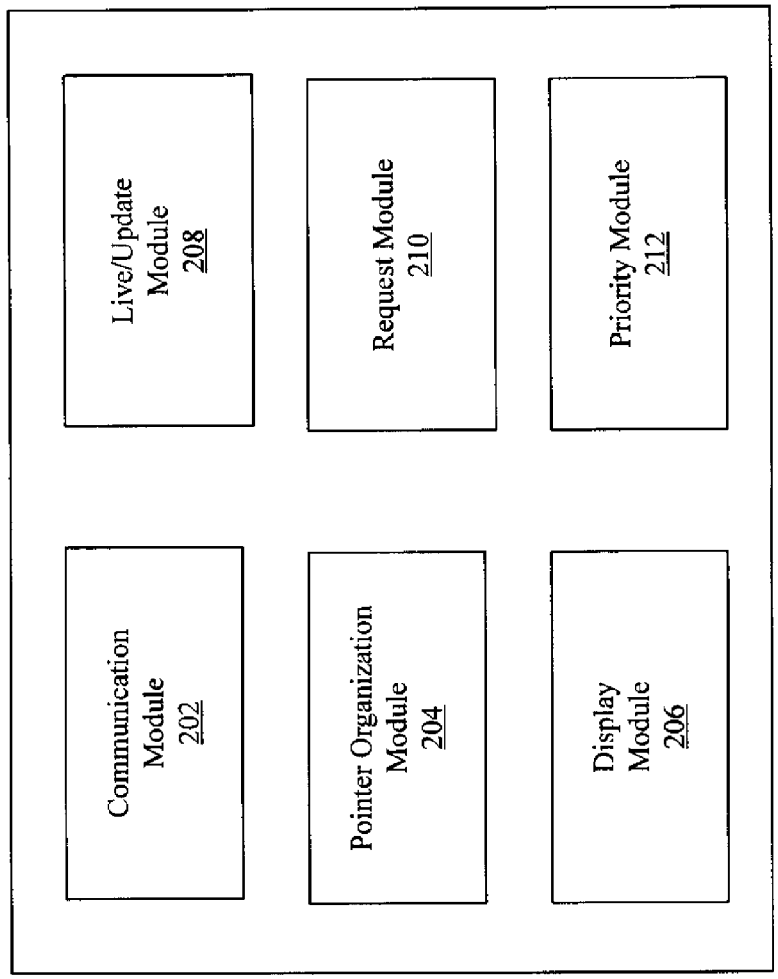
FIG. 2 illustrates exemplary modules of a set top box in accordance with exemplary embodiments.

FIG. 2 illustrates exemplary modules of a set top box 106 in accordance with exemplary embodiments. In an exemplary embodiment, the set top box 106 may include a communication module 202, a pointer organization module 204, a display module 206, a live/update module 208, a request module 210, and a priority module 212. It is noted that the modules 202, 204, 206, 208, 210, and 212 are exemplary. The functions of the modules 202, 204, 206, 208, 210, and 212 may be performed by other modules remote or local to the set top box 106, and the modules 202, 204, 206, 208, 210, and 212 may be combined and/or separated.

The communication module 202 may include software and/or hardware configured to provide communication between the set top box 106 and the network 104. The communication module 202 may forward the update messages, live session messages, and/or messages received from the network 104 to the other modules 204, 206, 208, 210, and 212, and may communicate messages received from the modules 204, 206, 208, 210, and 212 to the network 104.

The pointer organization module 204 may include software and/or hardware configured to receive and/or analyze one or more user inputs from a user via the input device 112 to identify last application data. User inputs may include one or more commands to display and/or activate one or more applications from one or more users via the input device 112. In various embodiments, last application data may include data associated with a recently and/or frequently accessed application provided by the last applications system 100. For example, the pointer organization module 204 may receive and/or analyze one or more user inputs to determine one or more recently and/or frequently accessed applications provided by the last applications system 100.

Identifying last application data may include accessing and/or identifying one or more last application identifiers associated with one or more last applications. Accordingly, each last application may include a last application identifier. A last application identifier may include an identifier that uniquely identifies a particular last application from other applications. The last application identifier may include a number sequence, a letter sequence, a symbol sequence, combinations thereof, and/or other information to uniquely identify the last application.

For example, a last application may include a Video On Demand (VOD) movie recently accessed and/or viewed by a user, such as, "Forest Gump" and may be associated with the last application identifier "000ABC." In another example, a last application may include a Digital Video Recorder (DVR) version of a television show recently accessed and/or viewed by a user, such as, episode 29 of the television show "Friends" and may be associated with the last application identifier "111XYZ." In yet another example, a last application may include a draft of an Email recently accessed and/or viewed by a user, such as, "To: johndoe@Acme.com, Subject: Schedule of Meeting, Body: Dear John . . . " and may be associated with the last application identifier "ABCDEF."

Identifying last application data may include accessing and/or identifying one or more category identifiers associated with one or more last applications. Accordingly, each last application may include a category identifier. A category identifier may include an identifier that uniquely identifies a particular category from other categories. The category identifier may include a number sequence, a letter sequence, a symbol sequence, combinations thereof, and/or other information to uniquely identify the category.

For example, an "Email Applications" category may be associated with the category identifier of "000." A "VOD Applications" category may be associated with the category identifier of "001." A "TV Broadcast Applications" category may be associated with the category identifier "010." A "DVR Applications" category may be associated with the category identifier "011." A "Chat Applications" category may be associated with the category identifier of "100." A "Gaming Applications" category may be associated with the category identifier "101." A "News Applications" category may be associated with the category identifier "110."

In various embodiments, each last application may be associated with one or more identifiers, such as, a last application identifier and/or a category identifier. Accordingly, the VOD movie "Forest Gump" last application previously described may be associated with the last application identifier "000ABC" and/or the category identifier of "001." The DVR version of a television show "Friends" last application previously described may be associated with the last application identifier "111XYZ" and/or the category identifier "011." The Email "To: johndoe@Acme.com, Subject: Schedule of Meeting, Body: Dear John . . . " last application previously described may be associated with the last application identifier "ABCDEF" and/or the category identifier of "000."

The pointer organization module 204 may be configured to store a pointer associated with each last application identified by the pointer organization module 204. A pointer may include data that identifies a last application and/or identifies the location of the last application in memory. A pointer may include data associated with the last instruction executed by the last application. Accordingly, a pointer may indicate the next instruction to be executed by the last application in the event the user requests the last application. A pointer may also include context information associated with one or more last applications. Context information may include data that indicates the last state of the last application. For example, context information may indicate the value of one or more variables associated with the last state of a last application, the last state of memory (e.g., Cache memory, RAM), the last state of a communication thread (e.g., a chat thread), and/or any other information needed to re-activate one or more last applications. Accordingly, the pointer organization module 204 may be configured to store a pointer (and context information) associated with each last application identified by the pointer organization module 204.

In various embodiments, the pointer organization module 204 may store one or more pointers and/or context information on local memory on one or more set top boxes 106 (one or more other platforms, such as, a laptop) associated with a local network (e.g., a home network). Accordingly, the one or more pointers and/or context information and one or more last applications may be accessed by a user using the one or more set top boxes. In various embodiments, the pointer organization module 204 may transmit one or more pointers and/or context information to the server 102 for storage. Accordingly, the server 102 may provide the one or more pointers and/or context information to one or more set top boxes 106 to activate one or more last applications.

It should be noted that automatically providing one or more last applications for various users within a household may be achieved dynamically. In various embodiments, each user of the household may have a separate login identification and/or password for the set top box 106. In this example, each user of the household may be associated with a separate last application user profile (a profile specific to an individual user that indicates one or more last applications associated with that user) in the last application system 100. Once the set top box 106 receives login information and/or a password associated with a particular user, the set top box 106 may also store the last application data associated with the user separate from other last application data associated with other users. This may be particularly useful in households with many residents. In another embodiment, login identifications and/or passwords may not be necessary. For example, each user of a household may be identified by the last application system 100, via a login, an on-screen option, finger recognition associated with the input device 112, speech recognition, radio frequency identification (RFid), and/or any other technology that may be used to identify a user from one or more other users.

In various embodiments, the pointer organization module 204 may be configured to store and/or arrange one or more last applications and/or one or more pointers associated with one or more last applications in chronological order.

In various embodiments, the pointer organization module 204 may be configured to store and/or arrange one or more last applications and/or one or more pointers associated with one or more last applications in one or more categories. For example, the pointer organization module 204 may be configured to store and/or arrange one or more last applications and/or one or more pointers associated with one or more last applications by Email Applications, VOD Applications, TV Broadcast Applications, DVR Applications, Chat Applications, Gaming Applications, News Applications, and/or any other category determined based on design preferences, by accessing one or more category identifiers. The pointer organization module 204 may arrange each category by storing one or more last applications and/or one or more pointers associated with one or more last applications associated with each category in chronological order.

The priority module 212 may include software and/or hardware configured to prioritize one or more last applications and/or one or more pointers associated with one or more last applications based on usage data. Usage data may include data that indicates the amount of time a user viewed and/or accessed a last application, the amount of time that has past since a user has viewed and/or accessed a last application, the number of times a user has viewed and/or accessed a last application, and/or any other data that may be used to indicate last application usage.

In various embodiments, the priority module 212 may select a finite number of last applications to be displayed in a scroll bar of last applications based on the usage data. In various embodiments, the finite number of last applications to be displayed in a scroll bar of last applications may be changed based on design preferences and/or user preferences.

For example, the priority module 212 may select the last fifteen last applications viewed and/or accessed by a user to be displayed in a scroll bar of last applications. In another example, the priority module 212 may select the last ten last applications associated with a particular category (e.g., Email Applications, VOD Applications, TV Broadcast Applications, DVR Applications, Chat Applications, Gaming Applications, News Applications) viewed and/or accessed by a user to be displayed in a scroll bar of last applications. In yet another example, the priority module 212 may select the last two last applications of each category to be displayed in a scroll bar of last applications.

In various embodiments, the priority module 212 may select a finite number of last applications to be displayed in a scroll bar of last applications by applying a least recently used algorithm and/or a least frequently used algorithm to one or more last applications. A least frequently used algorithm may include a priority algorithm that first discards the least frequently viewed and/or accessed last applications. Accordingly, the priority module 212 may be configured to monitor how often a last application is viewed and/or accessed. A least recently used algorithm may include a priority algorithm that first discards the least recently viewed and/or accessed last applications. Accordingly, the priority module 212 may assign and/or monitor age bits associated with each last application. Age bits may include one or more bits that indicate the amount of time a last application has existed relative to one or more other last applications.

In various embodiments, the priority module 212 may discard an amount of last applications in each category necessary to maintain a predetermined number of last applications in each category. Accordingly, the priority module 212 may first discard the least recently viewed and/or accessed last applications. For example, the implementers of the last application system 100 may determine the number of last applications in each category to be ten. The priority module 212, therefore, may discard an amount of least recently viewed and/or accessed last applications to maintain the amount of last applications in each category at ten.

In various embodiments, the priority module 212 may be configured to discard last applications associated with age bits greater than a predetermined age threshold. Accordingly, if a last application is associated with age bits that are older than the predetermined age threshold, the priority module 212 may discard the last application.

The live/update module 208 may include software and/or hardware configured to request one or more live session messages and/or one or more update messages from the server 102 in response to a request message received by the request module 210. In various embodiments, the live/update module 208 may include a last application identifier and/or a category identifier associated with the requested last application in the request to server 102.

The live/update module 208 may include software and/or hardware configured to receive one or more live session messages and/or one or more update messages from the server 102 and aggregate the data associated with the one or more live session messages and/or one or more update messages with the appropriate requested last application using the last application identifier and/or a category identifier included with the messages. For example, the live/update module 208 may request and/or receive a live session message associated with live session data needed to reconnect a last application associated with a network session (e.g., chat session) prior to the last application being outputted to the user via the display module 206.

In various embodiments, one or more last applications associated with one or more network sessions may be assigned a sufficient amount of bandwidth such that the live communication may remain uninterrupted. In various embodiments, one or more last applications associated with one or more network sessions may be disconnected after a predetermined period of inactivity and may need a live session message to reestablish the network session.

The request module 210 may include software and/or hardware configured to receive one or more request messages from a user via the input device 112, cause the display of one or more last applications, and/or allow user access to one or more last applications. A request message may include one or more user inputs requesting the display of a list of one or more last applications available to be accessed and/or viewed by the user. A request message may include one or more user inputs requesting access to one or more last applications.

In various embodiments, the request module 210 may display a list of one or more last applications available to be accessed based on the prioritization of the priority module 212. In various embodiments, the request module 210 may allow user access to one or more last applications in response to a request for the last application. If, for example, the requested is associated with a network session and/or update information, the request module 210 may transmit a request to the live/update module 208 for one or more live session messages and/or one or more update messages for the last application prior to displaying the last application.

The display module 206 may include software and/or hardware configured to control display of last application information (e.g., a visual and/or audible representation of one or more last applications) and/or various graphical user interfaces at the display device 108. To cause display of one or more last applications, the display module 206 may receive instructions from the input device 112, may retrieve and/or tune to a particular last application based on the received instructions, and may cause display of the particular last application at the display device 108. The display module 206 may cause display of a last applications graphical user interface (GUI), a last applications menu GUI, and a last applications scroll bar GUI at the display device 108. The last applications GUI, the last applications menu GUI, and the last applications scroll bar GUI are discussed below in further detail.

Figure 3:
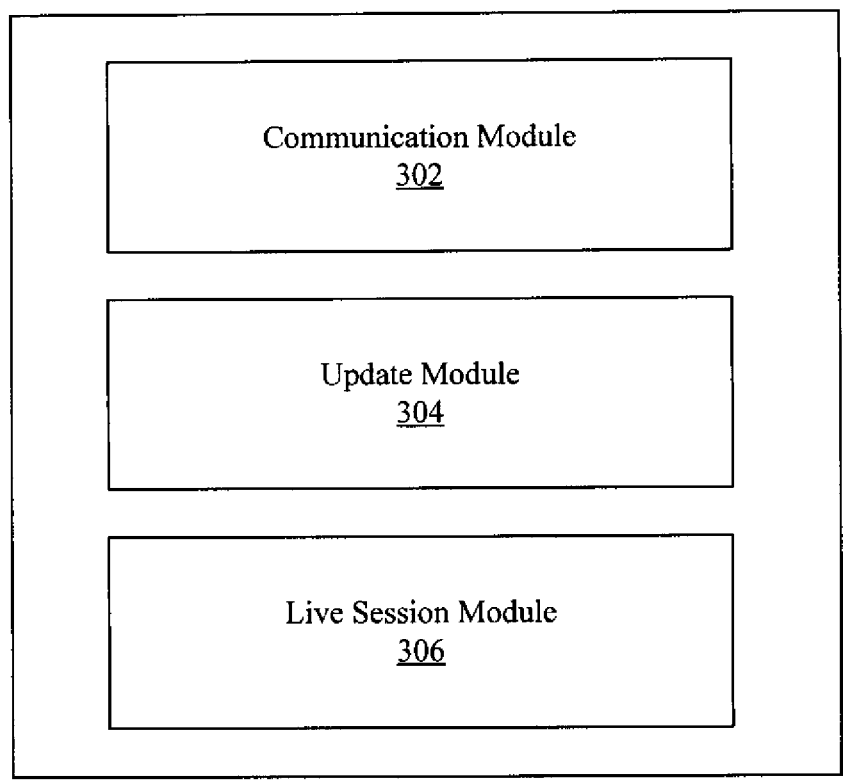
FIG. 3 illustrates various modules of a server in accordance with exemplary embodiments.

FIG. 3 illustrates various modules of the server in accordance with exemplary embodiments. In an exemplary embodiment, the server 102 may include a communication module 302, an update module 304, and a live session module 306. It is noted that the modules 302, 304, and 306 are exemplary. The functions of the modules 302, 304, and 306 may be performed at other modules remote or local to the server 102, and the modules 302, 304, and 306 may be combined and/or separated.

The communication module 302 may communicate update message signals and/or live session message signals from the server 102 to the network 104. The communication module 302 also may communicate messages received from the modules 304 and 306 to the network 104, and may communicate messages to the modules 304 and 306 received from the network 104.

The update module 304 may include software and/or hardware configured to retrieve update data associated with one or more last applications and/or generate one or more update message signals based on the update data in response to a request from the set top box 106. Update data may include data associated with providing one or more last applications with the most recent data. For example, one or more last applications may be associated with a sports game (e.g., a football game between the Washington Redskins and the New York Giants) that is in the process of being played. Accordingly, the update module 304 may retrieve and/or access the latest and/or most recent statistics of the sports game, such as, the score of the sports game, the time remaining in the sports game, the current injured players list, etc.

The update module 304 may generate one or more update message signals based on the update data. An update message signal may include update data associated with a particular last application. Accordingly, the update module 304 may communicate an update message signal that includes the last application identifier of the particular last application to the set top box 106.

The update module 304 may include software and/or hardware configured to generate one or more live session message signals in response to a request from the set top box 106. A live session message signal may include live session data used to establish and/or reestablish a network session configured to allow live communication between one or more set top boxes 106 located at different user premises 110 for one or more last applications. For example, one or more last applications may be associated with a chat session between one or more users associated with one or more set top boxes 106 located at different user premises 110. Accordingly, prior to the chat session being displayed as a last application, the update module 304 may generate one or more live session message signals associated with reconnecting (e.g., reestablishing) the chat session between the one or more users associated with the one or more set top boxes 106, in the event the chat session is disconnected. The update module 304 may communicate a live session message signal that includes the last application identifier of a particular last application to the set top box 106.

Figure 4:
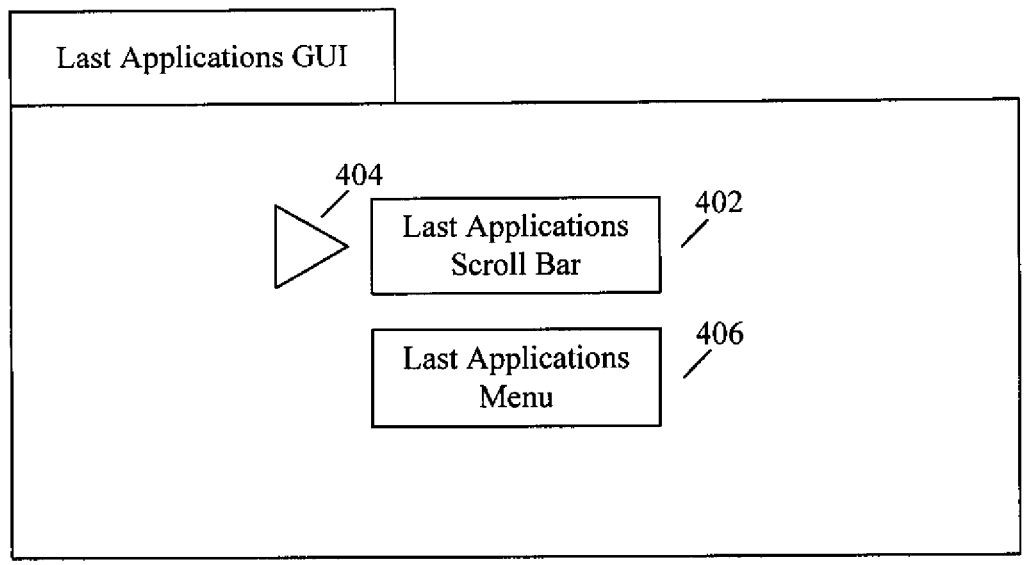
FIG. 4 illustrates an exemplary screen shot of a last applications graphical user interface in accordance with exemplary embodiments.

FIG. 4 illustrates an exemplary screenshot of a last applications graphical user interface 400 in accordance with exemplary embodiments. In an exemplary embodiment, the last applications graphical user interface 400 may be arranged as depicted in FIG. 4. The last applications graphical user interface 400 may permit the viewer to instruct the set top box 106 to retrieve and/or display a last applications scroll bar graphical user interface and/or a last applications menu graphical user interface at the display device 108.

In an exemplary embodiment, the last applications graphical user interface 400 may be displayed in response to a viewer request to view the last applications graphical user interface 400. For example, the viewer may use the input device 112 to generate a request for the set top box 106 to cause the display of the last applications graphical user interface 400 at the display device 108. In various embodiments, the viewer may press a button (e.g., the "LAST" button) associated with the input device 112 to generate a last applications graphical user interface request. When the last applications graphical user interface request is received, the display module 206 of the set top box 106 may generate and/or display the last applications graphical user interface 400.

The viewer may use the input device 112 to select the "Last Applications Scroll Bar" request field 402 or the "Last Applications Menu" request field 406. In an exemplary embodiment, the last applications graphical user interface 400 may include an indicator 404 to identify which request fields 402, 406 are selected, and the viewer may press an input key on the input device 112 to generate a select message requesting that the set top box 106 display the graphical user interface associated with the selected request field. In various embodiments, the indicator 404 initially may be located next to a field (e.g., request field 402, request field 406) that is most accessed by the user. If, for example, the viewer selects the "Last Applications Scroll Bar" request field 402, the display module 206 may retrieve and/or display the last applications scroll bar graphical user interface described in further detail in FIG. 6. If, however, the viewer selects the "Last Applications Menu" request field 406, the display module 206 may retrieve and/or display the last applications menu graphical user interface described in further detail in FIG. 5.

Figure 5:
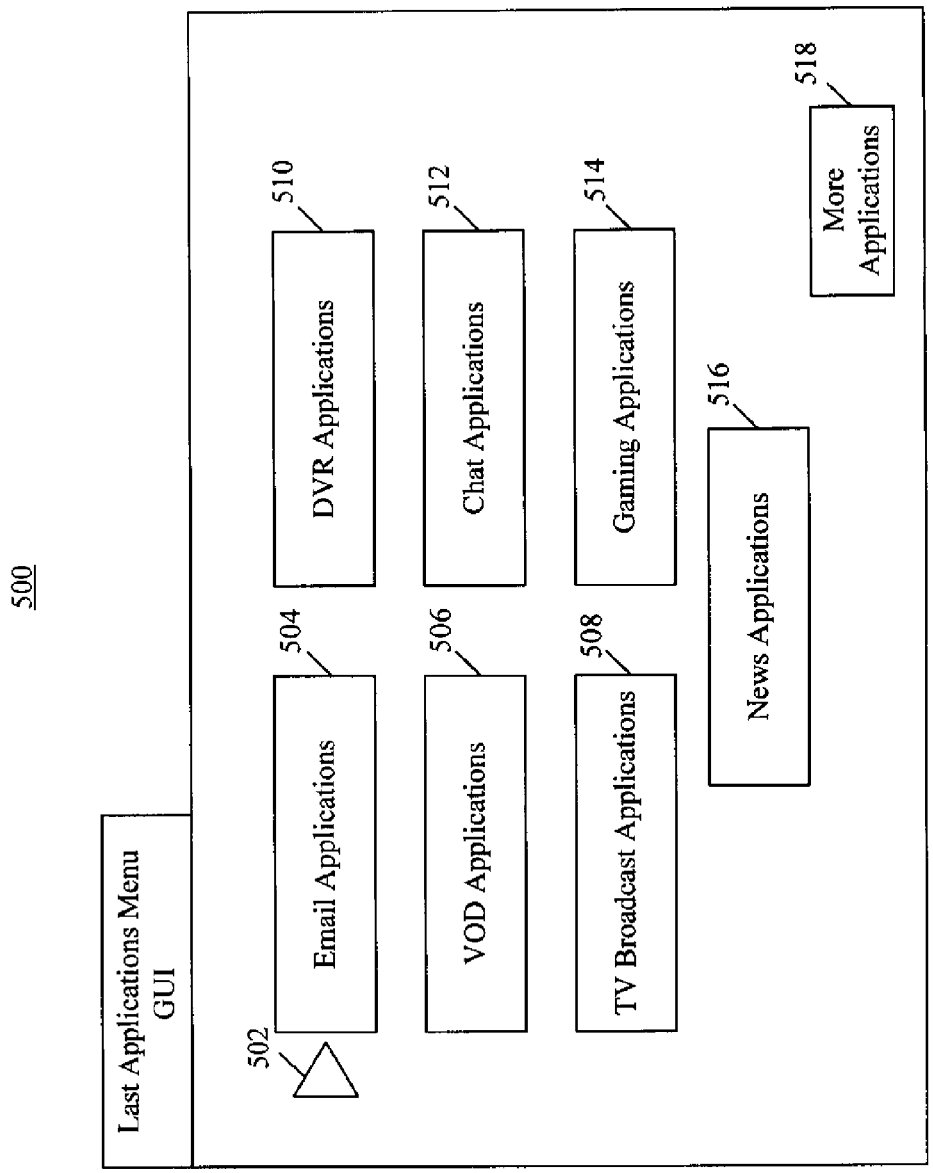
FIG. 5 illustrates an exemplary screen shot of a last applications menu graphical user interface in accordance with exemplary embodiments.

FIG. 5 illustrates a last applications menu graphical user interface 500 in accordance with exemplary embodiments. In an exemplary embodiment, the last applications menu graphical user interface 500 may be arranged as depicted in FIG. 5. The last applications menu graphical user interface 500 may permit the viewer to access and/or view one or more last applications stored by category. In an exemplary embodiment, the last applications menu graphical user interface 500 may be displayed in response to a viewer request to view the last applications menu graphical user interface 500.

A viewer may use the input device 112 to select the category desired by moving the indicator 502 next to the category of interest and the viewer may press an input key on the input device 112 to generate a select message requesting that the set top box 106 display the category associated with the selected request field. In various embodiments, the indicator 502 initially may be located next to a field (e.g., "VOD Applications" request field 506) that is most accessed by the user.

In various embodiments, last applications menu graphical user interface 500 may list one or more categories. For example, the viewer may select the Email Applications category, the VOD Applications category, the TV Broadcast Applications category, the DVR Applications category, the Chat Applications category, the Gaming Applications category, and/or the News Applications category by moving the indicator 502 next to the "Email Applications" request field 504, the "VOD Applications" request field 506, the "TV Broadcast Applications" request field 508, the "DVR Applications" request field 510, the "Chat Applications" request field 512, the "Gaming Applications" request field 514, and/or the "News Applications" request field 516, respectively, and pressing an input key (e.g., "OK" button) on the input device 112. In various embodiments, selecting the one or more request fields described above may cause the set top box 106 to display one or more last applications associated with the category selected at the display device 108. In various embodiments, the one or more last applications displayed may be determined by the pointer organization module 204 and/or the priority module 212 described above.

A viewer may use the input device 112 to request more categories to be display at the display device 108 by moving the indicator 502 next to the "More Applications" request field 518 and pressing an input key (e.g., "OK" button) on the input device 112.

Figure 6:
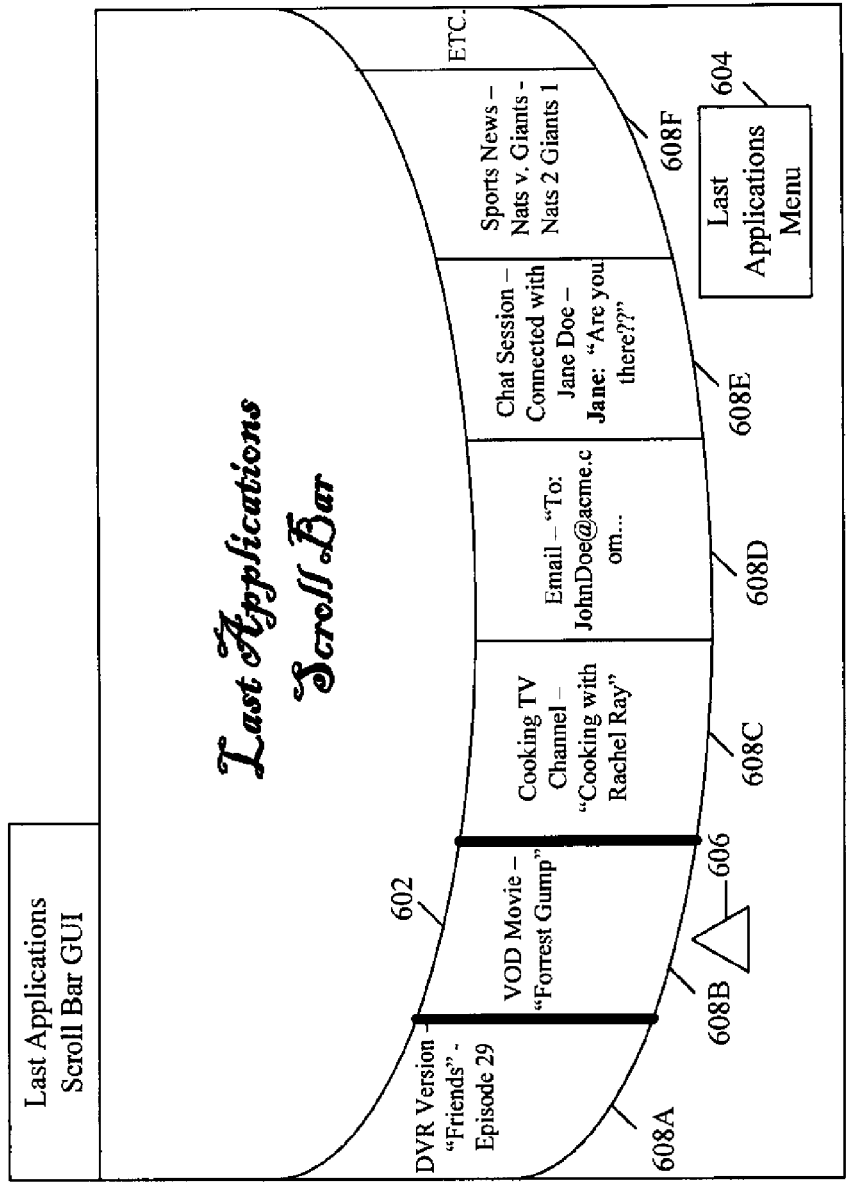
FIG. 6 illustrates an exemplary screen shot of a last applications scroll bar graphical user interface in accordance with exemplary embodiments.

FIG. 6 illustrates a last applications scroll bar graphical user interface 600 in accordance with exemplary embodiments. In an exemplary embodiment, the last applications scroll bar graphical user interface 600 may be arranged as depicted in FIG. 6. The last applications scroll bar graphical user interface 600 may permit the viewer to access and/or view a finite number of last applications stored based on priority determined by the priority module 212. In an exemplary embodiment, the last applications scroll bar graphical user interface 600 may be displayed in response to a viewer request to view the last applications scroll bar graphical user interface 600.

A viewer may use the input device 112 to select a desired last application by moving the indicator 606 next to the last application of interest and the viewer may press an input key on the input device 112 to generate a select message requesting that the set top box 106 access and/or display the last application associated with the request. In an exemplary embodiments, the scroll bar 602 may be configured to rotate next to the indicator 606.

In various embodiments, the last applications scroll bar graphical user interface 600 may list one or more last applications. For example, the last applications scroll bar graphical user interface 600 may list a DVR Version—"Friends"—episode 29 last application 608A, a VOD Movie—"Forrest Gump" last application 608B, a Cooking TV Channel—"Cooking with Rachel Ray" last application 608C, an Email—"To: JohnDoe@acme.com . . . " last application 608D, a Chat Session—Connected with Jane Doe—Jane: "Are you there??" last application 608E, a Sports News—Nats v. Giants—Nats 2 Giants 1 last application 608F, and/or any other last application determined by the pointer organization module 204 and/or the priority module 212. In various embodiments, the last applications scroll bar graphical user interface 600 may display one or more images of one or more last applications. For example, the last applications scroll bar graphical user interface 600 may display the last frame viewed of a VOD Movie, the image of a Chat Session, the current image of a TV Channel broadcast program, etc.

A viewer may use the input device 112 to request the last applications menu graphical user interface 500 to be displayed at the display device 108 by moving the indicator 606 next to the "Last Applications Menu" request field 604 and pressing an input key (e.g., "OK" button) on the input device 112. In various embodiments, a viewer may access and/or view a sequence of one or more last applications by repeatedly and/or continuously pressing a button on the input device 112 (e.g., the "LAST" button). For example, a first press of a "LAST" button may display a DVR Version—"Friends"—episode 29, a second press of a "LAST" button may display a VOD Movie—"Forrest Gump", a third press of a "LAST" button may display a Cooking TV Channel—"Cooking with Rachel Ray", a fourth press of a "LAST" button may display an Email—"To: JohnDoe@acme.com . . . ", a fifth press of a "LAST" button may display a Chat Session—Connected with Jane Doe—Jane: "Are you there??", a sixth press of a "LAST" button may display a Sports News—Nats v. Giants—Nats 2 Giants 1, etc. In various embodiments, the sequence of one or more last applications may be displayed without a menu and/or a scroll bar.

In various embodiments, the last applications system 100 may be configured to display, at a display device 108, a time line (not shown) associated with a last application. A time line may include one or more images associated with one or more play times (e.g., a particular time in a last application) of a last application. For example, a time line of a DVR recording of the movie "Jurassic Park" may include an image of the movie during the introduction credits, an image of the movie during the climax, an image of the movie during the closing credits, and/or any other images at any other play times. In various embodiments, a user may access a particular play time in time line of a last application by entering a number of minutes from the beginning of the last application using the input device 112. In various embodiments, a user may access a particular play time in a time line of a last application by highlighting one or more images in the time line and pressing an input button (e.g., the "OK" button) on the input device 112. In various embodiments, a user may access a particular play time in a time line of a last application by highlighting one or more images in the time line using an indicator (not shown) associated with the time line. In various embodiments, one or more additional timelines may be associated with one or more images of a time line of a last application. Accordingly, a user may access the additional time lines by accessing the one or more images using techniques previously described.

Figure 7:
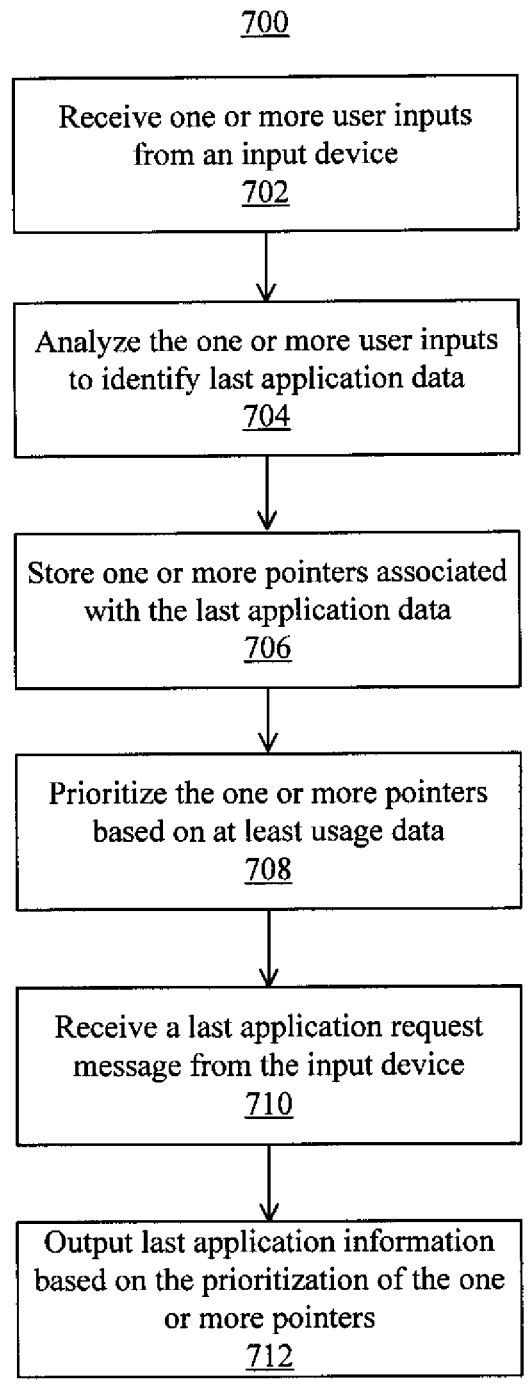
FIG. 7 illustrates a flowchart of a method for providing a plurality of last applications in accordance with exemplary embodiments.

FIG. 7 illustrates a flowchart of a method 700 for providing a plurality of last applications in accordance with exemplary embodiments. This exemplary method is provided by way of example, as there are a variety of ways to carry out methods disclosed herein. The method 700 shown in FIG. 7 can be executed or otherwise performed by one or a combination of various systems. The method 700 is described below as carried out by the last applications system 100 shown in FIG. 1 by way of example, and various elements of the last applications system 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the method 700 may include receiving one or more user inputs from an input device. In an exemplary embodiment, the communication module 202 may receive the one or more user inputs from the viewer using an input device 112. The method 700 may continue to block 704.

In block 704, the method 700 may include analyzing the one or more user inputs to identify last application data. In an exemplary embodiment, the pointer organization module 204 may analyze the one or more user inputs to identify last application data (e.g., one or more last applications). Analyzing one or more user inputs to identify last application data may include accessing one or more last application identifiers and/or one or more category identifiers. The method 700 may continue to block 706.

In block 706, the method 700 may include storing one or more pointers associated with the last application data. In an exemplary embodiment, the pointer organization module 204 may store one or more pointers associated with one or more last applications and/or one or more pointers indicating the memory location of one or more last applications. The method 700 may continue to block 708.

In block 708, the method 700 may include prioritizing the one or more pointers (e.g., the one or more last applications) based on at least usage data. In an exemplary embodiment, the priority module 212 and/or the pointer organization module 204 may prioritize the one or more pointers based on at least usage data. In an exemplary embodiment, prioritizing the one or more pointers may include applying a least recently used algorithm to the one or more pointers. In an exemplary embodiment, prioritizing the one or more pointers may include applying a least frequently used algorithm to the one or more pointers. The method 700 may continue to block 710.

In block 710, the method 700 may include receiving a request message from the input device 112. In an exemplary embodiment, the request module 210 may receive the request message from the input device 112. The display device 108 may display one or more last applications using one or more graphical user interfaces described above. The method 700 may continue to block 712.

In block 712, the method 700 may include causing the display of one or more last applications. In an exemplary embodiment, the display module 206 may cause display of one or more last applications at the display device 108. In various embodiments, causing the display of one or more last applications may include accessing one or more pointers and/or context information from memory. The method 700 may then end.

Figure 8:
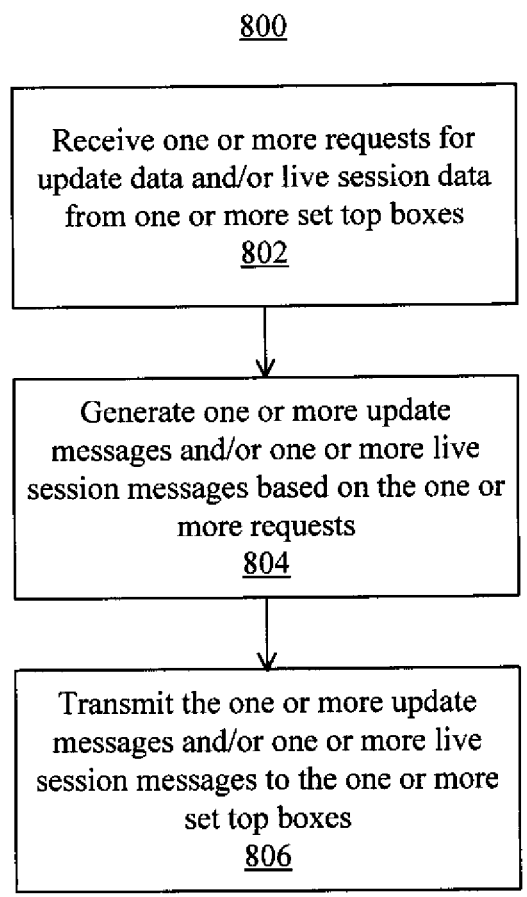
FIG. 8 illustrates a flowchart of another method for providing a plurality of last applications in accordance with exemplary embodiments.

FIG. 8 illustrates a flowchart of another method 800 for providing a plurality of last applications in accordance with exemplary embodiments. This exemplary method is provided by way of example, as there are a variety of ways to carry out methods disclosed herein. The method 800 shown in FIG. 8 can be executed or otherwise performed by one or a combination of various systems. The method 800 is described below as carried out by the last applications system 100 shown in FIG. 1 by way of example, and various elements of the last applications system 100 are referenced in explaining the example method of FIG. 8. Each block shown in FIG. 8 represents one or more processes, methods, or subroutines carried in the exemplary method 800. Referring to FIG. 8, the exemplary method 800 may begin at block 802.

In block 802, the method 800 may include receiving one or more requests for update data and/or live session data from one or more set top boxes 106. In an exemplary embodiment, the communication module 302 may receive the one or more requests for update data and/or live session data from the one or more set top boxes via the network 104. The method 800 may continue to block 804.

In block 804, the method 800 may include generating one or more update messages and/or one or more live session messages. In an exemplary embodiment, the update module 304 may generate one or more update messages based on the update data retrieved and/or accessed from one or more external news sources (e.g., CNN News, ESPN News) and/or update sources and/or one or more internal news feeds for the one or more last applications associated with the one or more requests. In an exemplary embodiment, the live session module 306 may generate one or more live session messages based on the live session data associated with the one or more last applications of the one or more requests. The method 800 may continue to block 806.

In block 806, the method 800 may include transmitting the one or more update messages and/or one or more live session messages to the one or more set top boxes 106. In an exemplary embodiment, the communication module 302 may transmit the one or more update messages and/or one or more live session messages to the one or more set top boxes via the network 104. The method 800 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving, at a set top box, one or more user inputs from an input device;
   analyzing the one or more user inputs to identify last application data comprising one or more last applications accessed by a user;
   storing a plurality of pointers corresponding to a plurality of last applications associated with the last application data such that the plurality of pointers are stored based upon a category associated with each of the plurality of last applications wherein the category identifies a type associated with each of the plurality of last applications accessed by the user;
   prioritizing the plurality of pointers based on at least usage data;
   receiving, at the set top box, one or more request messages from the input device;
   selecting one or more of the plurality of last applications based on the one or more request messages, wherein the one or more request messages direct the selecting based upon the category; and
   outputting, to a display device, last application information associated with the selected one or more of the plurality of last applications, in response to receiving the one or more request message.

2. The method of claim 1, wherein analyzing the one or more user inputs to identify last application data further comprises accessing one or more last application identifiers.

3. The method of claim 1, wherein the plurality of pointers comprise context information.

4. The method of claim 1, wherein prioritizing plurality of pointers associated with the last application data further comprises applying a least frequently used algorithm to the plurality pointers.

5. The method of claim 1, wherein prioritizing the plurality of pointers associated with the last application data further comprises applying a least recently used algorithm to the plurality pointers.

6. The method of claim 1, wherein outputting further comprises receiving an update message from a server and aggregating update data associated with the update message with the last application data.

7. The method of claim 1, wherein outputting further comprises receiving a live session message from a server and aggregating live session data associated with the live session message with the last application data.

8. The method of claim 1, further comprising outputting, to a display device, a time line associated with one or more last applications.

9. The method of claim 1, further comprising identifying last application information based on a user identification.

10. A non transitory computer readable media comprising code to perform the acts of the method of claim 1.

11. A system comprising:
  a communication module configured to receive one or more user inputs from an input device;
  a pointer organization module configured to analyze the one or more user inputs to identify last application data that comprises one or more last applications accessed by a user and store a plurality of pointers corresponding to a plurality of last applications associated with the last application data such that the plurality of pointers are stored based upon a category associated with each of the plurality of last applications wherein the category identifies a type associated with each of the plurality of last applications accessed by the user;
  a priority module configured to prioritize the plurality of pointers based on at least usage data;
  a request module configured to receive one or more request messages from the input device;
  the request module configured to select one or more of the plurality of last applications based on the received one or more request message; and
  a display module configured to output last application information associated with the selected one or more of the plurality of last applications, in response to receiving the one or more request messages.

12. The system of claim 11, wherein the pointer organization module is further configured to analyze the one or more user inputs to identify last application data by accessing one or more last application identifiers.

13. The system of claim 11, wherein the plurality of pointers comprise context information.

14. The system of claim 11, wherein the priority module is further configured to prioritize the plurality of pointers associated with the last application data by applying a least frequently used algorithm to the one or more pointers.

15. The system of claim 11, wherein the priority module is further configured to prioritize the plurality of pointers associated with the last application data by applying a least recently used algorithm to the plurality of pointers.

16. The system of claim 11, wherein the system further comprises a live/update module configured to receive a live session message from a server and aggregate live session data associated with the live session message with the last application data.

17. The system of claim 11, wherein the system further comprises a live/update module configured to receive a live session message from a server and aggregate live session data associated with the live session message with the last application data.

18. The system of claim 11, wherein the system is further configured to identify last application information based on a user identification.

19. A method, comprising:
  receiving, at a set top box, one or more user inputs from an input device;
  analyzing the one or more user inputs to identify last application data comprising one or more last applications accessed by a user;
  storing a plurality of pointers corresponding to a plurality of last applications associated with the last application data such that the plurality of pointers are stored based upon a category associated with each of the plurality of last applications wherein the category identifies a type associated with each of the plurality of last applications accessed by the user;
  prioritizing the plurality of pointers based at least usage data, wherein prioritizing the plurality of pointers comprises applying at least one of a least frequently used algorithm and a least recently used algorithm to the plurality of pointers;
  receiving, at the set top box, one or more request messages from the input device;
  selecting one or more of the plurality of last applications based on the one or more request messages; and
  outputting, to a display device, last application information associated with the selected one or more of the plurality of last applications in a scroll bar graphical user interface, in response to receiving the one or more request messages.

20. The method of claim 19, wherein analyzing the one or more user inputs to identify last application data further comprises accessing one or more last application identifiers.

21. The method of claim 19, wherein the plurality of pointers comprise context information.

22. The method of claim 19, wherein outputting further comprises receiving an update message from a server and aggregating update data associated with the update message with the last application data.

23. The method of claim 19, wherein outputting further comprises receiving a live session message from a server and aggregating live session data associated with the live session message with the last application data.

24. The method of claim 19, further comprising outputting, to a display device, a time line associated with one or more last applications.

25. The method of claim 19, further comprising identifying last application information based on a user identification.

* * * * *